(12) United States Patent
Tsai

(10) Patent No.: US 12,528,219 B2
(45) Date of Patent: Jan. 20, 2026

(54) TILE CUTTING MACHINE AND ABUTTING DEVICE THEREOF

(71) Applicant: REXON INDUSTRIAL CORP., LTD., Taichung (TW)

(72) Inventor: Cheng-Hsun Tsai, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 112 days.

(21) Appl. No.: 18/645,806

(22) Filed: Apr. 25, 2024

(65) Prior Publication Data
US 2024/0367333 A1    Nov. 7, 2024

(30) Foreign Application Priority Data
May 5, 2023   (TW) ................................ 112116825

(51) Int. Cl.
*B26D 7/04*    (2006.01)
*B26D 1/14*    (2006.01)
*B26D 7/20*    (2006.01)

(52) U.S. Cl.
CPC ............... *B26D 7/04* (2013.01); *B26D 1/141* (2013.01); *B26D 7/20* (2013.01)

(58) Field of Classification Search
CPC .............. B26D 7/04; B26D 7/20; B26D 1/141
See application file for complete search history.

(56) References Cited

U.S. PATENT DOCUMENTS

| | | | | |
|---|---|---|---|---|
| 3,348,591 A | * | 10/1967 | Carrasco | B23Q 16/001 269/297 |
| 5,050,472 A | * | 9/1991 | Potzsch | B26D 3/008 83/785 |
| 5,497,685 A | * | 3/1996 | Mohr | B26D 7/04 83/365 |
| 5,524,515 A | * | 6/1996 | Boda | B26D 5/02 83/485 |
| 6,276,990 B1 | * | 8/2001 | Greenland | B23D 47/025 451/11 |
| 7,308,844 B2 | * | 12/2007 | Sheddy | B27B 27/10 125/35 |
| 11,109,888 B1 | * | 9/2021 | Zahid | A61B 17/322 |

(Continued)

FOREIGN PATENT DOCUMENTS

TW        I593532 B    8/2017

*Primary Examiner* — Omar Flores Sanchez
(74) *Attorney, Agent, or Firm* — Birch, Stewart, Kolasch & Birch, LLP

(57) ABSTRACT

A tile cutting machine includes a workbench, a cutting unit, and a table having two side surfaces, a load surface, and first and second end surfaces that are connected between the side surfaces. The abutting device includes an abutting member and a fixing unit. The abutting member includes a first limiting surface, a second limiting surface, a first abutting surface, and a second abutting surface, and is movable between a first working position, where the first abutting surface abuts against the first end surface of the table, and the first limiting surface is substantially perpendicular to the load surface, and a second working position, where the second abutting surface abuts against the second end surface of the table, and the second limiting surface is substantially perpendicular to the load surface of the table. The fixing unit is disposed for securing the abutting member to the table.

9 Claims, 8 Drawing Sheets

(56) References Cited

U.S. PATENT DOCUMENTS

| | | | | |
|---|---|---|---|---|
| 2004/0031365 | A1* | 2/2004 | Lee | B23D 47/025 |
| | | | | 83/437.1 |
| 2005/0284278 | A1* | 12/2005 | Shimizu | B26D 7/20 |
| | | | | 83/614 |
| 2007/0125214 | A1* | 6/2007 | Dong | B26D 1/205 |
| | | | | 83/485 |
| 2008/0295819 | A1* | 12/2008 | Gifford | B23D 59/003 |
| | | | | 125/13.01 |
| 2008/0295821 | A1* | 12/2008 | Gifford | B27B 27/08 |
| | | | | 451/41 |
| 2011/0036219 | A1* | 2/2011 | Finnell | B26D 7/2635 |
| | | | | 83/13 |
| 2012/0125173 | A1* | 5/2012 | Nelson | B26D 1/065 |
| | | | | 83/886 |
| 2015/0197982 | A1* | 7/2015 | Lee | E06B 9/266 |
| | | | | 83/636 |
| 2021/0053790 | A1* | 2/2021 | Lin | B26F 1/3813 |
| 2022/0193952 | A1* | 6/2022 | You | B28D 1/047 |
| 2022/0274279 | A1* | 9/2022 | Jann | F16P 3/005 |
| 2025/0083354 | A1* | 3/2025 | Tsunoi | B26F 1/3813 |

* cited by examiner

US 12,528,219 B2

TILE CUTTING MACHINE AND ABUTTING DEVICE THEREOF

CROSS-REFERENCE TO RELATED APPLICATION

This application claims priority to Taiwanese Invention Patent Application No. 112116825, filed on May 5, 2023, the entire disclosure of which is incorporated by reference herein.

FIELD

The disclosure relates to a tile cutting machine, and more particularly to a tile cutting machine and an abutting device thereof.

BACKGROUND

A conventional supporting device for a conventional tile cutting machine as disclosed in Taiwanese Invention U.S. Pat. No. 1,593,532B includes a table that is adapted for supporting a tile, and a blocking plate that is pivotably mounted to the table, and that is adapted for abutting against the tile. To cut the tile with the tile cutting machine, the tile is placed on the table, and the table is moved in a sliding direction and through a cutting device of the tile cutting machine. The tile may be steadily supported during the cutting process by having the tile abut against the blocking plate while the table is moving.

The blocking plate is perpendicular to the sliding direction, and provides support in a direction parallel to the sliding direction. When the tile has a greater size compared to a size of the table, or when a length of the tile exceeds a length of the table, the blocking plate has to be detached from the tile and pivoted away from the table to avoid interference during the cutting process.

However, when the blocking plate is detached, it is unable to support the tile, resulting in the tile being unsteady when being moved. Hence, there is room for improvement.

SUMMARY

Therefore, an object of the disclosure is to provide an abutting device that can alleviate at least one of the drawbacks of the prior art.

According to the disclosure, the abutting device is adapted to be mounted to a tile cutting machine. The tile cutting machine includes a table that is slidable along an axis extending in a sliding direction, and a cutting unit that is operable for cutting a tile. The table has two side surfaces, a load surface, and first and second end surfaces. The two side surfaces are spaced apart in a widthwise direction substantially perpendicular to the sliding direction. The load surface is connected to the side surfaces for supporting the tile. The first and second end surfaces are spaced apart in the sliding direction and are connected between the side surfaces. The abutting device includes an abutting member and a fixing unit. The abutting member is adapted to be removably mounted to the table, and has a first limiting surface, a second limiting surface, a first abutting surface, and a second abutting surface. The second limiting surface is substantially perpendicular to the first limiting surface. The first abutting surface is substantially parallel to the first limiting surface. The second abutting surface is connected to the first abutting surface and is inclined relative to the first abutting surface by an angle. The angle is not greater than 90 degrees. The fixing unit is adapted for securing the abutting member to the table. The abutting member is movable between a first working position and a second working position. When the abutting member is in the first working position, the abutting member extends in the widthwise direction, the first abutting surface is adapted to abut against the first end surface of the table, and the first limiting surface is adapted to be substantially perpendicular to the load surface of the table. When the abutting member is in the second working position, the abutting member extends in the sliding direction, the second abutting surface is adapted to abut against the second end surface of the table, and the second limiting surface is adapted to be substantially perpendicular to the load surface of the table.

Another object of the disclosure is to provide a tile cutting machine that can alleviate at least one of the drawbacks of the prior art.

According to the disclosure, the tile cutting machine is adapted for cutting a tile. The tile cutting machine includes a workbench, a cutting unit, a table, and the abovementioned abutting device. The cutting unit includes a machine arm connected to the workbench, and a sawblade rotatably mounted to the machine arm and spaced apart from the workbench in a working direction. The table is mounted to the workbench, is slidable along an axis extending in a sliding direction into a space between the workbench and the sawblade. The sliding direction is substantially perpendicular to the working direction. The table includes two side surfaces, a load surface, and first and second end surfaces. The two side surfaces are spaced apart in a widthwise direction substantially perpendicular to the sliding direction and the working direction. The load surface is connected to the side surfaces for supporting the tile. The first and second end surfaces are spaced apart in the sliding direction and are connected between the side surfaces. The abutting device is removably mounted to the table.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
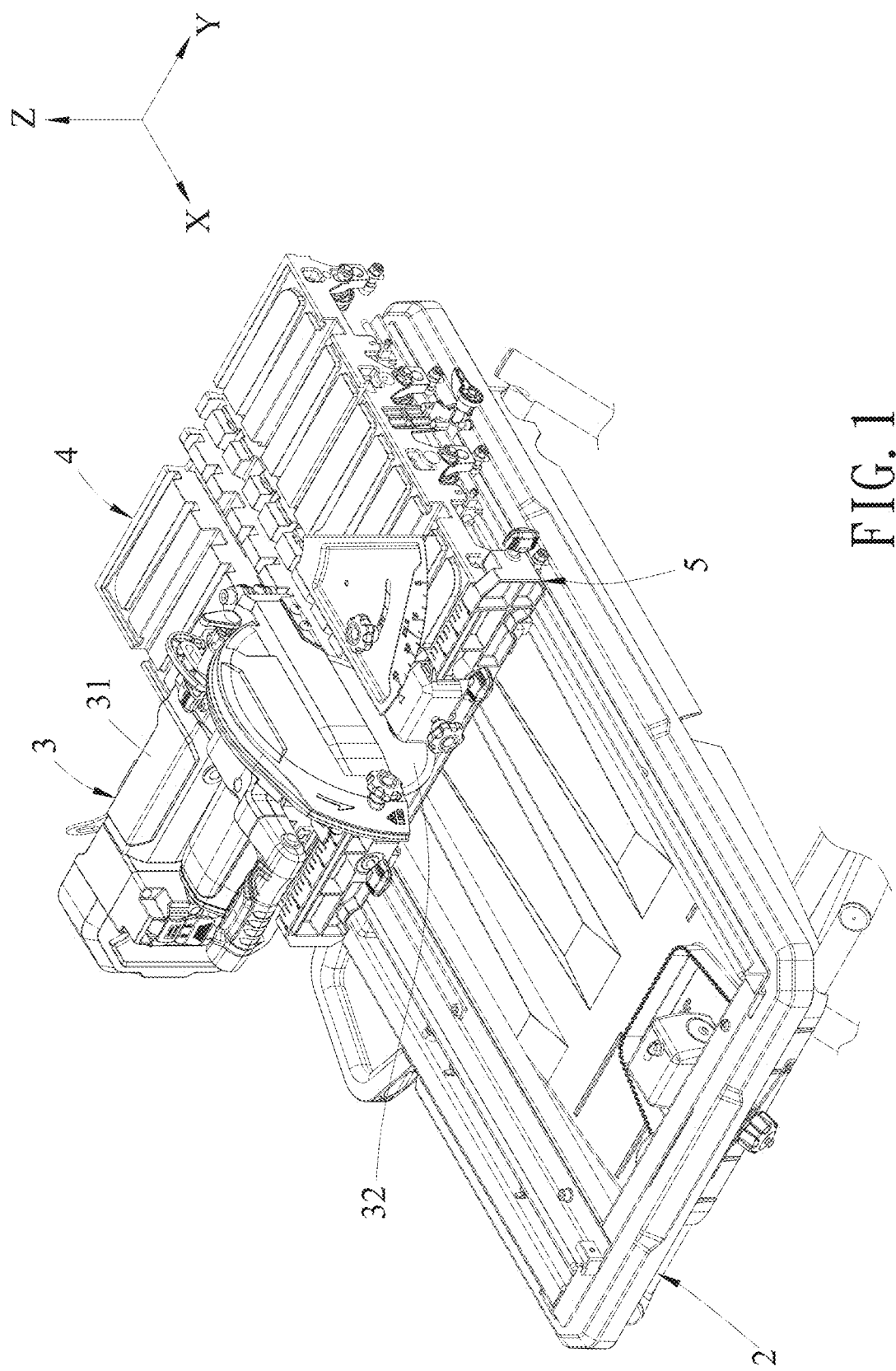
FIG. 1 is a fragmentary perspective view illustrating an embodiment of a tile cutting machine according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
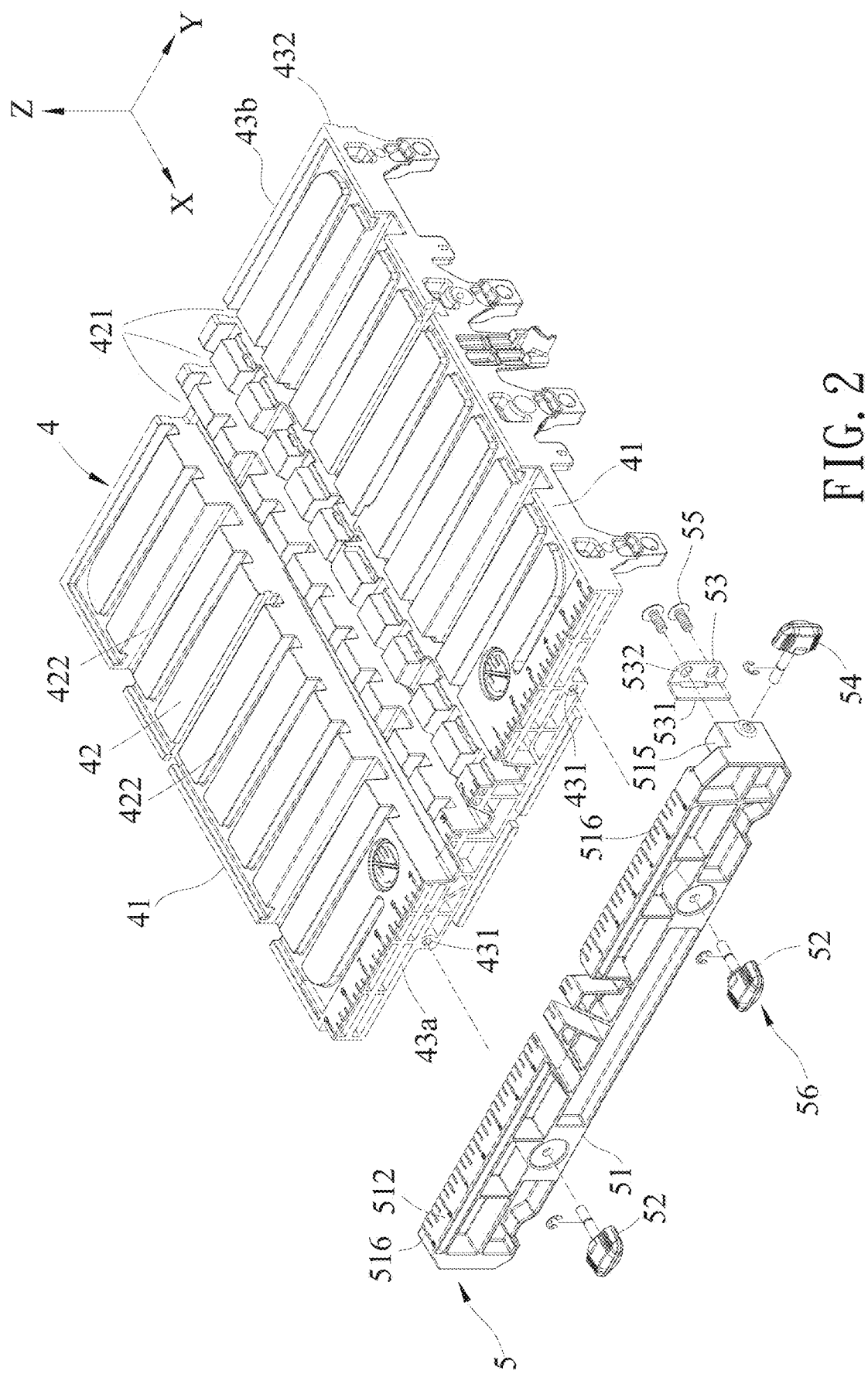
FIG. 2 is an exploded perspective view of a table and an abutting device of the embodiment.
Figure 3:
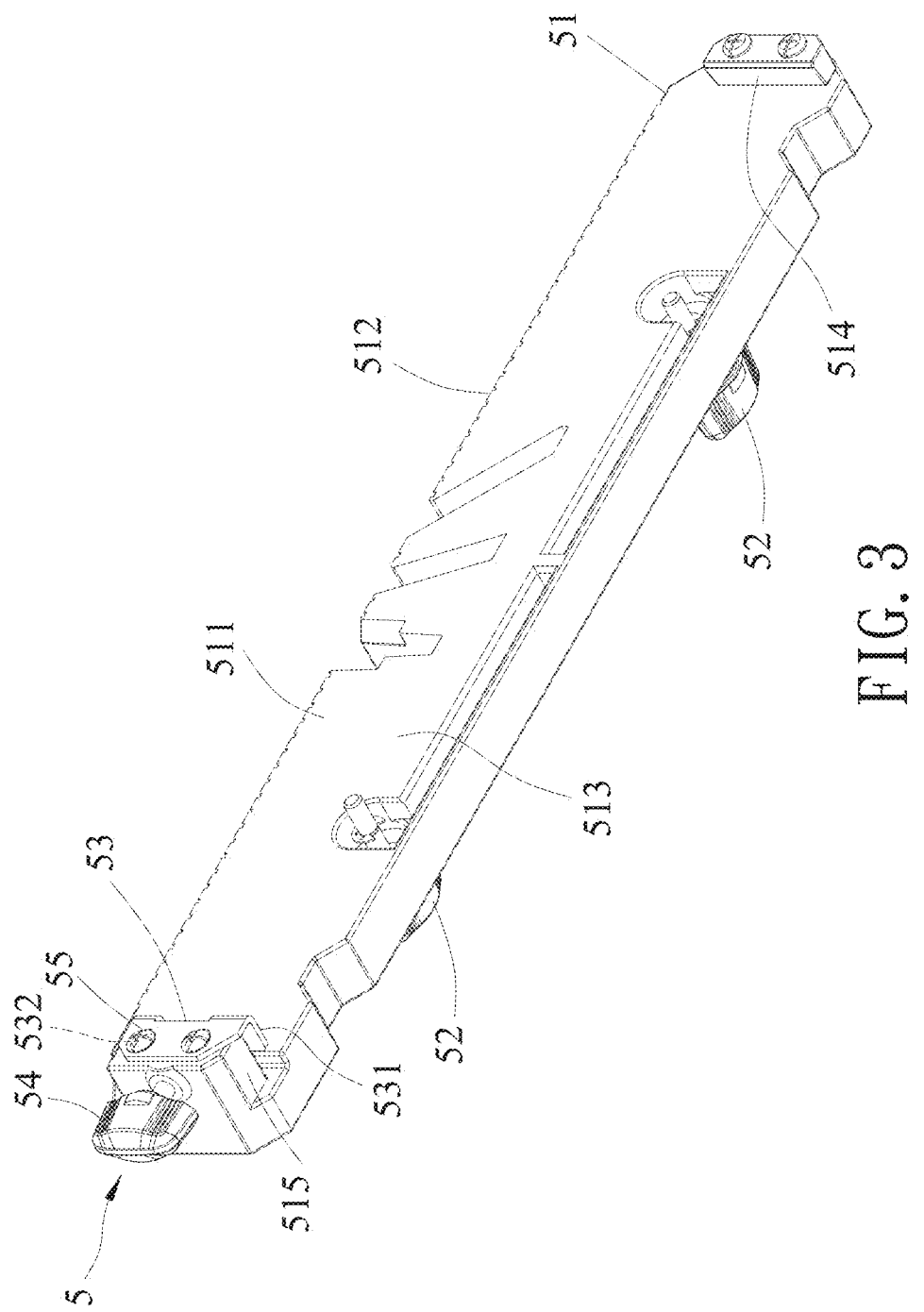
FIG. 3 is a perspective view of the abutting device.
Figure 4:
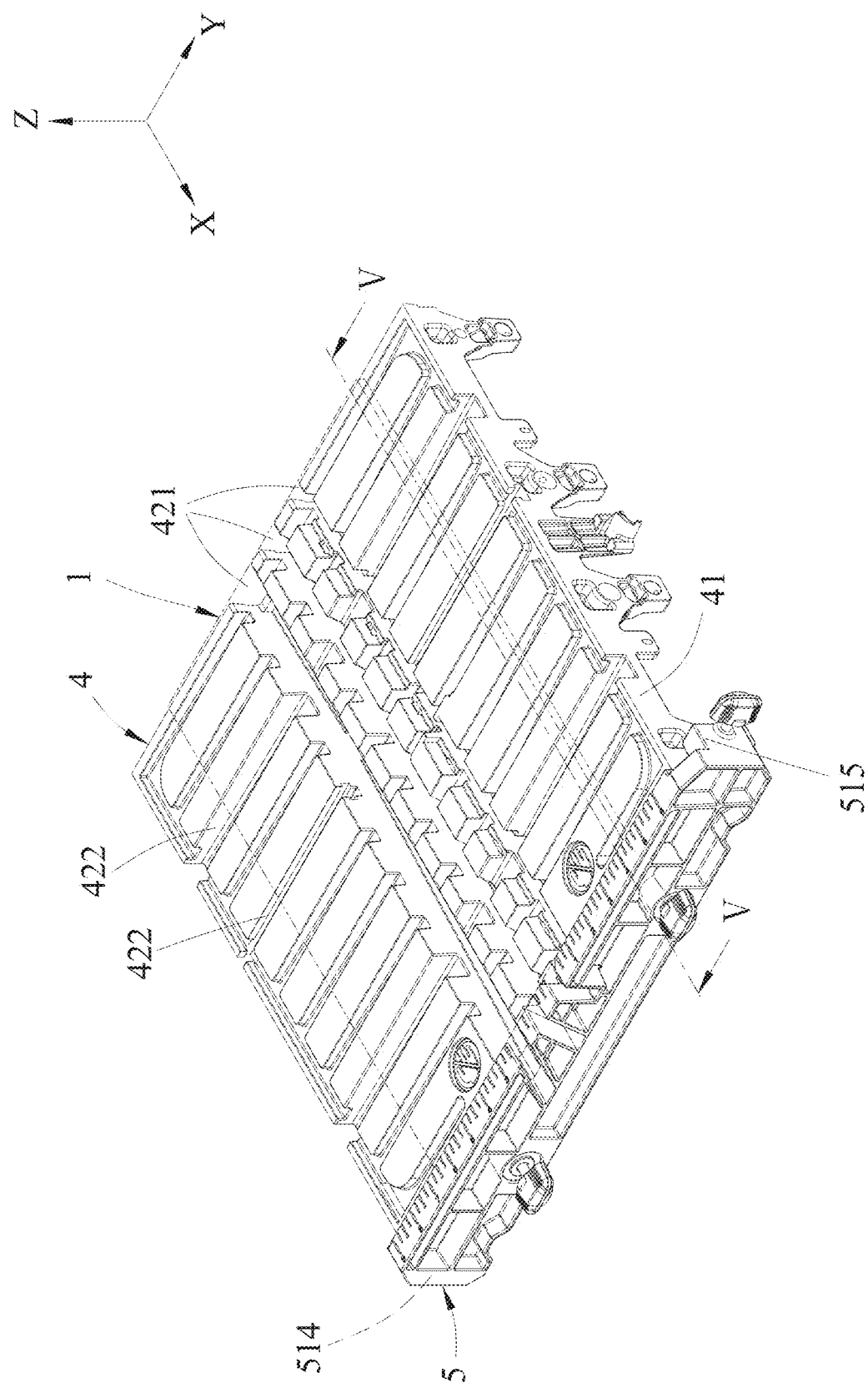
FIG. 4 is a fragmentary perspective view of the embodiment, illustrating an abutting member in a first working position.
Figure 6:
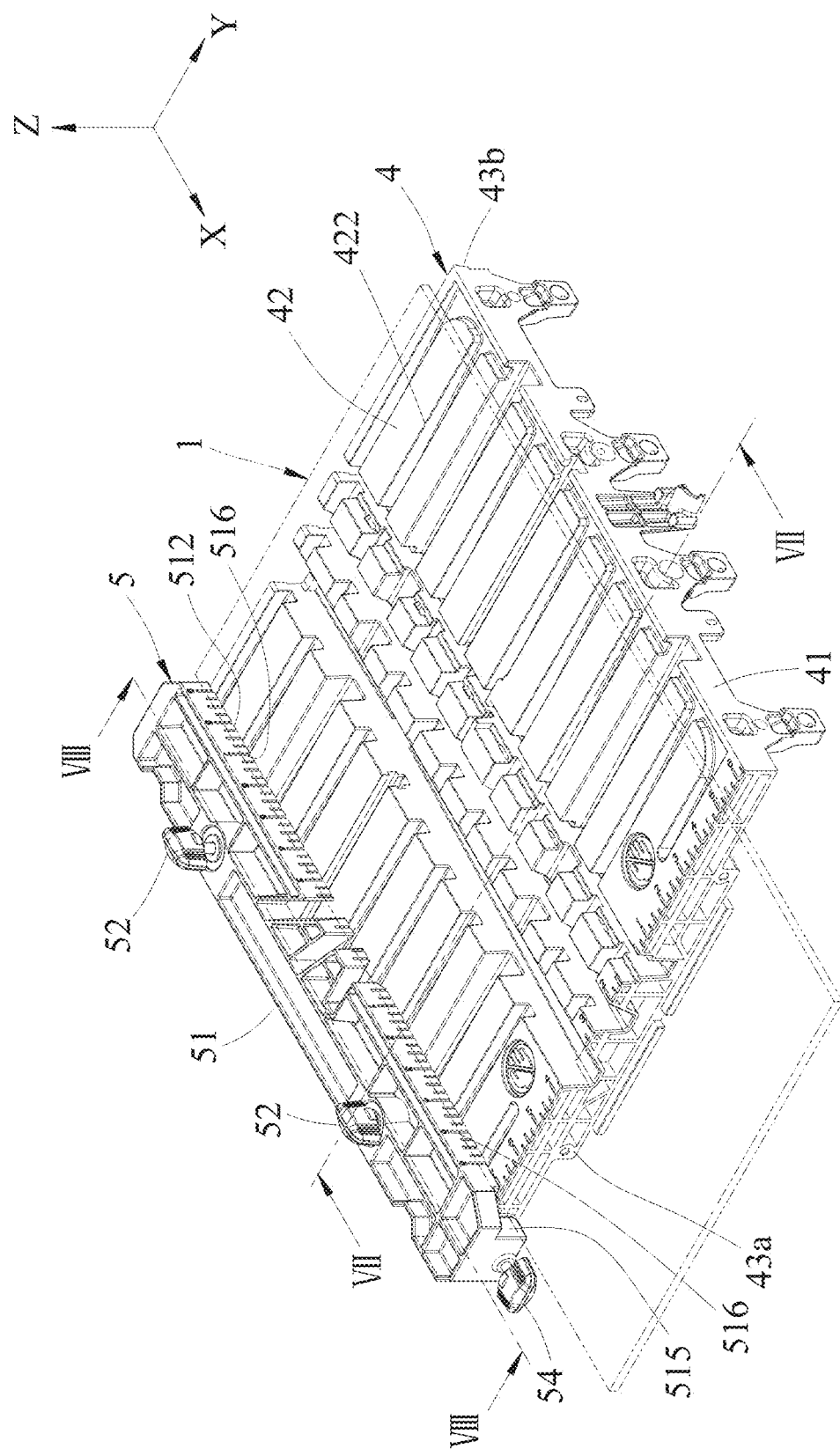
FIG. 6 is a fragmentary perspective view of the embodiment, illustrating the abutting member in a second working position.

Referring to FIGS. 1 to 3, an embodiment of a tile cutting machine according to the disclosure is adapted for cutting a tile 1 (see FIG. 4 and FIG. 6). The tile cutting machine includes a workbench 2, a cutting unit 3, a table 4, and an abutting device 5.

The cutting unit 3 includes a machine arm 31 connected to the workbench 2, and a sawblade 32 rotatably mounted to the machine arm 31, and spaced apart from the workbench 2 in a working direction (Z).

The table 4 is mounted to the workbench 2, and is slidable along an axis extending in a sliding direction (X) substantially perpendicular to the working direction (Z) into a space between the workbench 2 and the sawblade 32. The table 4 includes two side surfaces 41 that are spaced apart in a widthwise direction (Y) substantially perpendicular to the sliding direction (X) and the working direction (Z), a load surface 42 that is connected to the side surfaces 41 for supporting the tile 1, and first and second end surfaces 43a, 43b that are spaced apart in the sliding direction (X), and that are connected between the side surfaces 41. The load surface 42 has a plurality of receiving grooves 421 extending in the sliding direction (X) for receiving a tip of the sawblade 32. The load surface 42 further has a plurality of positioning grooves 422 extending in the widthwise direction (Y). The first end surface 43a has at least one threaded hole 431. In this embodiment, the first end surface 43a is a flat surface, and has two threaded holes 431. The second end surface 43b has a slope portion 432.

The abutting device 5 is mounted to the tile cutting machine, and includes an abutting member 51, a pushing member 53, a fixing unit 56, and two bolts 55.

The abutting member 51 is removably mounted to the table 4, and has a first limiting surface 511, a second limiting surface 512 that is substantially perpendicular to the first limiting surface 511, a first abutting surface 513 that is substantially parallel to the first limiting surface 511, a second abutting surface 514 that is connected to the first abutting surface 513 and that is inclined relative to the first abutting surface 513 by an angle (θ) (see FIG. 8), and a mounting portion 515 that is substantially perpendicular to the first abutting surface 513. The second limiting surface 512 has a plurality of markings 516 (see FIG. 6) equally distanced from each other. In this embodiment, the first abutting surface 513 is coplanar with the first limiting surface 511.

The angle (θ) is not greater than 90 degrees (see FIG. 8), and in this embodiment, the angle (θ) between the second abutting surface 514 and the first abutting surface 513 is an acute angle.

The fixing unit 56 secures the abutting member 51 to the table 4, and includes a plurality of fixing members 52 and a limiting member 54. In this embodiment, a number of the fixing members 52 is two. Each of the fixing members 52 is a threaded knob, extends through the abutting member 51, and is connected to the table 4.

The pushing member 53 is mounted to the mounting portion 515 of the abutting member 51, is movable along an axis parallel to a longitudinal axis of the abutting member 51, and has a pushing surface 531 that is substantially perpendicular to the first abutting surface 513, and two slotted holes 532 that are elongated in a direction parallel to the longitudinal axis of the abutting member 51.

The limiting member 54 is screwed to the mounting portion 515, and by changing an engagement depth of the limiting member 54 (i.e., how deep the limiting member 54 is screwed into the mounting portion 515), the limiting member 54 moves the pushing member 53 along the axis parallel to the longitudinal axis of the abutting member 51.

The bolts 55 respectively extend through the slotted holes 532 of the pushing member 53, and are screwed to the mounting portion 515. The bolts 55 do not tightly abut against the pushing member 53, but limit the movement of the pushing member 53. Specifically, the pushing member 53 are slidably mounted to the mounting portion 515, with the slotted holes 532 as a sliding path.

The abutting member 51 is movable between a first working position (see FIG. 4) and a second working position (see FIG. 6).

Figure 5:
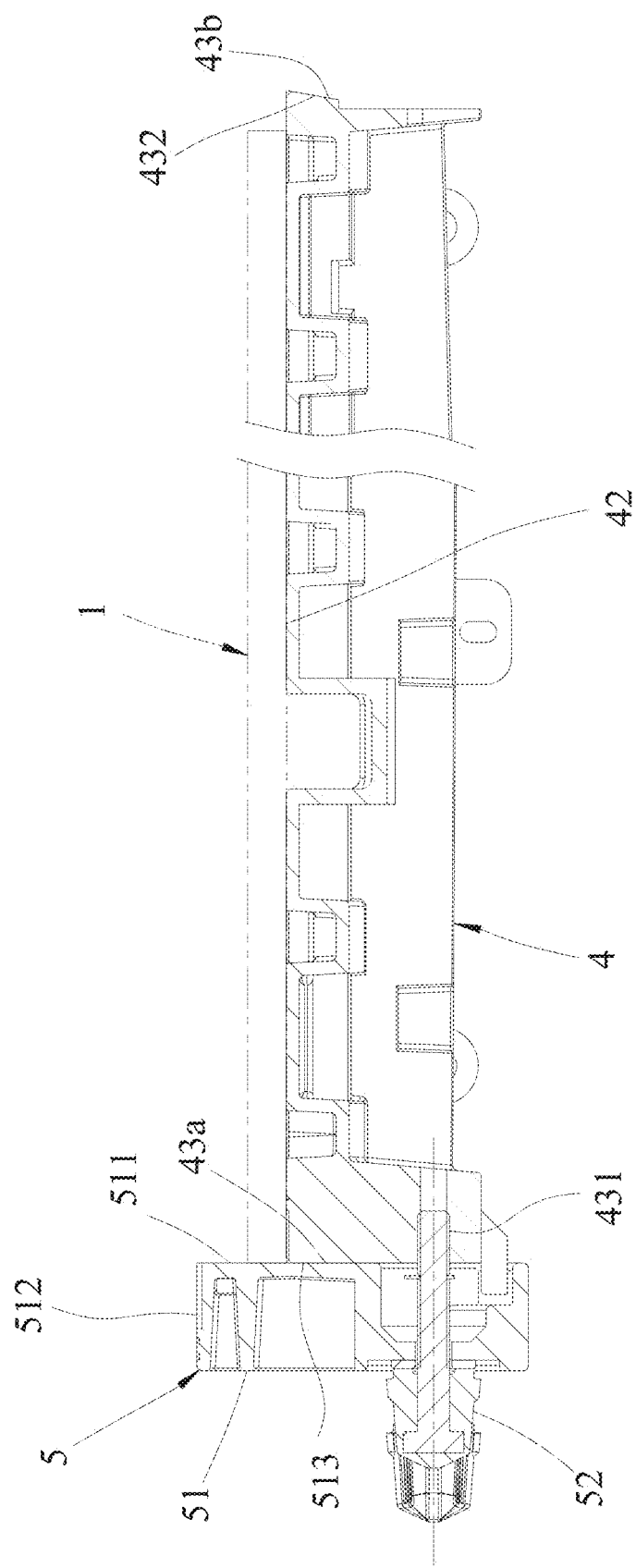
FIG. 5 is a fragmentary sectional view of the embodiment taken along line V-V in FIG. 4.

Referring to FIGS. 4 and 5, when the abutting member 51 is in the first working position, the abutting member 51 extends in the widthwise direction (Y), the first abutting surface 513 abuts against the first end surface 43a of the table 4, the mounting portion 515 is adjacent to one of the side surfaces 41, and the fixing members 52 (only one is shown in FIG. 5) extend through the first abutting surface 513 of the abutting member 51, and threadedly and respectively engage the threaded holes 431 (only one is shown in FIG. 5), thereby securing the abutting member 51 to the table 4, and preventing the abutting member 51 from moving in the sliding, widthwise and working directions (X, Y, Z). When the abutting member 51 is in the first working position, the first limiting surface 511 is substantially perpendicular to the load surface 42 of the table 4, and the second limiting surface 512 is spaced apart from the load surface 42 in the working direction (Z), exposing the markings 516.

At this time, the second abutting surface 514 of the abutting member 51 and the pushing member 53 do not abut tightly against the table 4.

Figure 7:
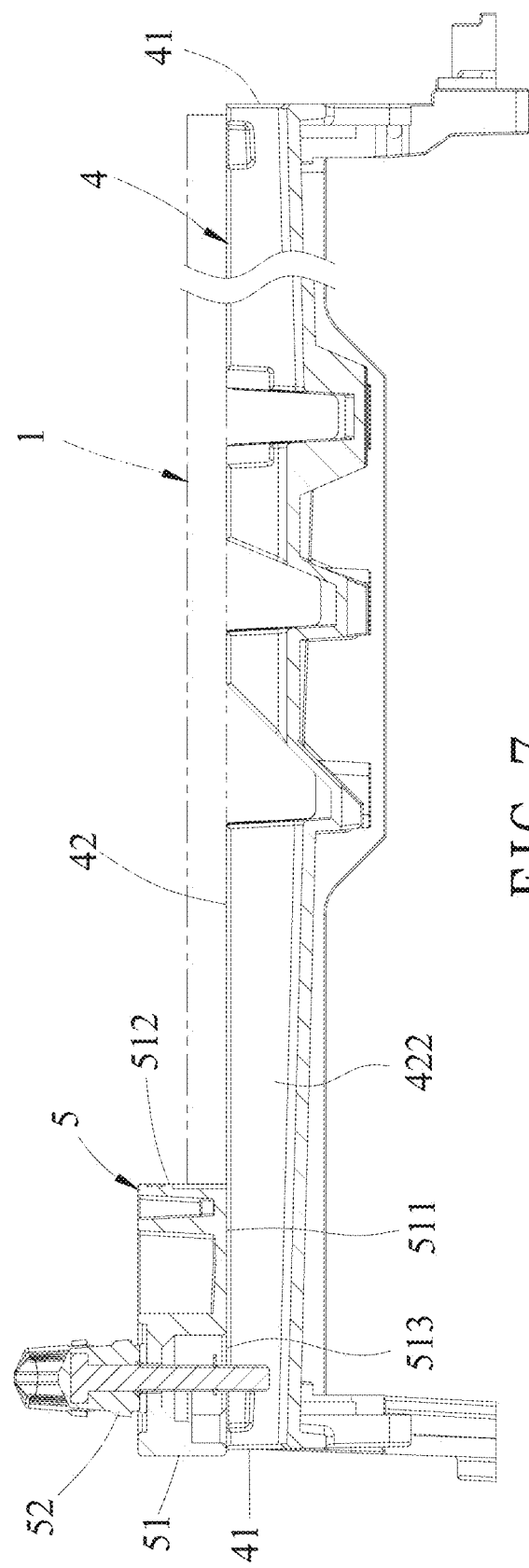
FIG. 7 is a fragmentary sectional view of the embodiment taken along line VII-VII in FIG. 6.
Figure 8:
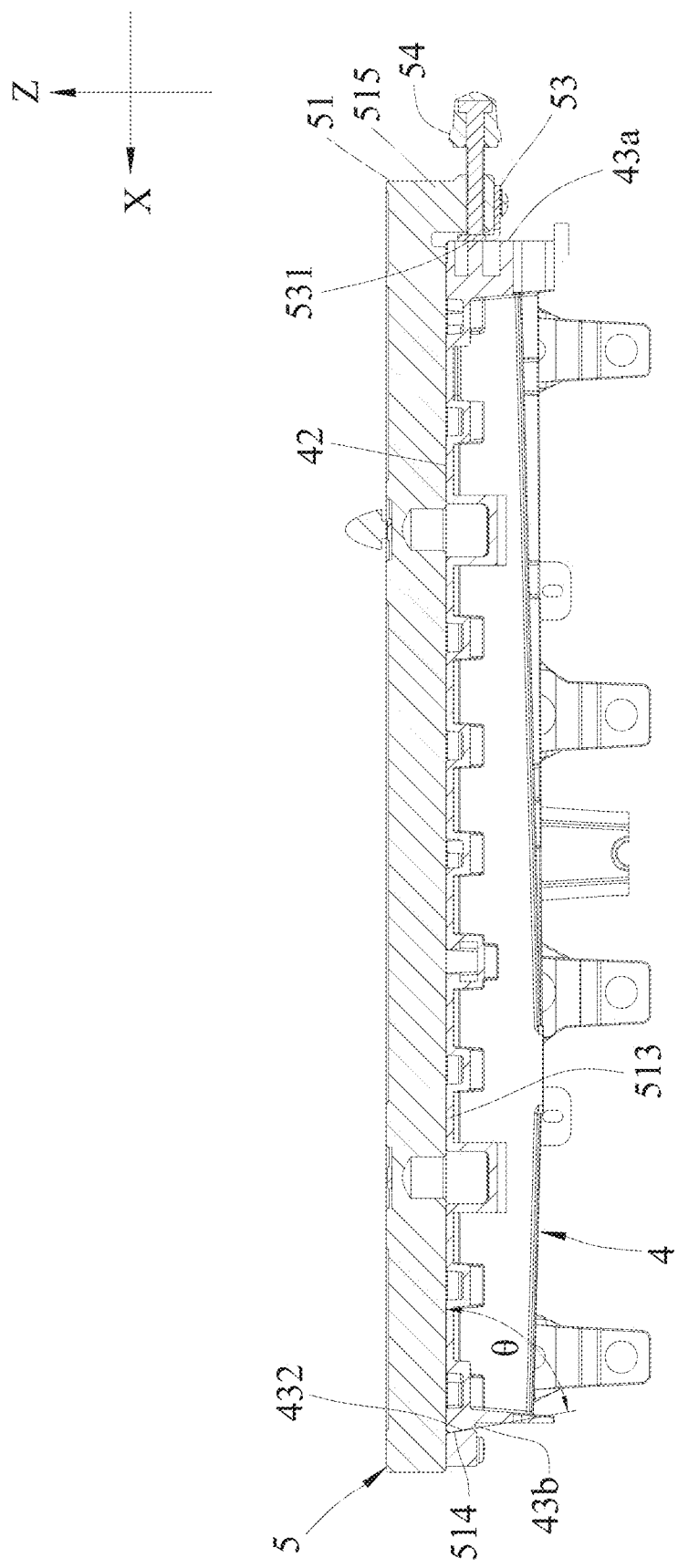
FIG. 8 is a fragmentary sectional view of the embodiment taken along line VIII-VIII in FIG. 6.

Referring to FIGS. 6 to 8, when the abutting member 51 is in the second working position, the abutting member 51 extends in the sliding direction (X), the first abutting surface 513 and the first limiting surface 511 abut against the load surface 42 of the table 4, the second abutting surface 514 abuts against the second end surface 43b of the table 4, and the mounting portion 515 is adjacent to the first end surface 43a. Specifically, when the abutting member 51 is in the second working position, the second abutting surface 514 of the abutting member 51 abuts against the slope portion 432 of the second end surface 43b of the table 4, and the limiting member 54 can be operated to move the pushing member 53 along the axis parallel to the longitudinal axis of the abutting member 51 to abut against the first end surface 43a of the table 4. By increasing the engagement depth of the limiting member 54, the pushing surface 531 of the pushing member 53 is driven to abut against the first end surface 43a, and the deeper the engagement depth, the higher the pressure exerted by the pushing member 53 unto the table 4. Hence, the abutting member 51 is secured to the table 4, and is prevented from moving in the sliding, widthwise and working directions (X, Y, Z). When the abutting member 51 is in the second working position, the second limiting surface 512 is substantially perpendicular to the load surface 42 of the table 4, and the markings 516 are exposed.

It should be noted that, when the abutting member 51 is in the second working position, the fixing members 52 are respectively disposed in two of the positioning grooves 422 of the load surface 42, and do not have abutting effects on the load surface 42. In other embodiments, the fixing members 52 may engage the load surface 42.

Referring to FIGS. 4 and 5, when a length of the tile 1 is not greater than a distance between the first and second end surfaces 43a, 43b, the tile 1 may be supported by the load surface 42 of the table 4 and the abutting device 5 when the abutting member 51 of the abutting device 5 is in the first working position. When the abutting member 51 is in the first working position, the tile 1 abuts against the first limiting surface 511 of the abutting member 51, and the first limiting surface 511 steadily supports the tile 1 when the table 4 slides along the axis extending in the sliding direction (X) into the space between the workbench 2 and the sawblade 32, thereby allowing the sawblade 32 to steadily cut the tile 1.

Referring to FIGS. 6 to 8, when the abutting member 51 is in the second working position, the table 4 is unobstructed in the sliding direction (X), so that when a length of the tile 1 is greater than the distance between the first and second end surfaces 43a, 43b, the tile 1 may be placed on the load surface 42 of the table 4 and may still be supported by the abutting device 5. When the abutting member 51 is in the second working position, the tile 1 abuts against the second limiting surface 512 of the abutting member 51, and the second limiting surface 512 steadily supports the tile 1 when the table 4 slides along the axis extending in the sliding direction (X) into the space between the workbench 2 and the sawblade 32, thereby allowing the sawblade 32 to steadily cut the tile 1.

It should be noted that, by loosening or tightening the fixing members 52 and the limiting member 54, the abutting member 51 may be dismounted or mounted to the table 4.

It should be noted that, a number of the threaded holes 431 is not limited to two, and it may change in other embodiments. Furthermore, a number of fixing members 52 is not limited to two, and it may change in other embodiments. The advantages of the embodiment are as follows:

By mounting the abutting member 51 in different positions, it steadily supports tiles with different sizes, and supports tiles in different directions, thereby allowing the tile cutting machine to cut tiles with different sizes.

By loosening or tightening the fixing members 52 and the limiting member 54, the abutting member 51 may be dismounted or mounted to the table 4. The structure of the abutting device 5 is simple, and the abutting device 5 is easy to be mounted or dismounted.

By virtue of the configurations of the first limiting surface 511, the second limiting surface 512, the first abutting surface 513, and the second abutting surface 514, the abutting member 51 may be mounted to the table 4, a position of the abutting member 51 may be restricted, and the markings 516 may be exposed. Hence, the abutting device 5 provides steady support, and the objective of the embodiment is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, the one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An abutting device is adapted to be mounted to a tile cutting machine, the tile cutting machine including a table that is slidable along an axis extending in a sliding direction, and a cutting unit that is operable for cutting a tile, the table having two side surfaces that are spaced apart in a widthwise direction substantially perpendicular to the sliding direction, a load surface that is connected to the side surfaces for supporting the tile, and first and second end surfaces that are spaced apart in the sliding direction and that are connected between the side surfaces, said abutting device comprising:
    an abutting member that is adapted to be removably mounted to the table, and that has
        a first limiting surface,
        a second limiting surface substantially perpendicular to said first limiting surface,
        a first abutting surface substantially parallel to said first limiting surface, and
        a second abutting surface connected to said first abutting surface and inclined relative to said first abutting surface by an angle, said angle being not greater than 90 degrees; and
    a fixing unit that is adapted for securing said abutting member to the table;
    wherein said abutting member is movable between a first working position and a second working position;
    wherein, when said abutting member is in the first working position, said abutting member extends in the widthwise direction, said first abutting surface is adapted to abut against the first end surface of the table, and said first limiting surface is adapted to be substantially perpendicular to the load surface of the table; and
    wherein, when said abutting member is in the second working position, said abutting member extends in the sliding direction, said second abutting surface is adapted to abut against said second end surface of the table, and said second limiting surface is adapted to be substantially perpendicular to the load surface of the table.

2. The abutting device as claimed in claim 1, wherein:
said first abutting surface is coplanar with said first limiting surface;
when said abutting member is in the first working position, said second limiting surface is adapted to be spaced apart from the load surface in a working direction that is substantially perpendicular to the sliding direction and the widthwise direction; and
when said abutting member is in the second working position, said first abutting surface and said first limiting surface are adapted to abut against the load surface of the table.

3. The abutting device as claimed in claim 1, wherein said second limiting surface has a plurality of markings equally distanced from each other.

4. The abutting device as claimed in claim 1, wherein said angle between said second abutting surface and said first abutting surface is an acute angle.

5. The abutting device as claimed in claim 1, wherein said fixing unit includes a plurality of fixing members, each of said fixing members being a threaded knob, extending through said abutting member, and being adapted to be connected to the table.

6. The abutting device as claimed in claim 1, wherein:
said abutting device further comprises a pushing member;
said fixing unit includes a limiting member;
said abutting member further has a mounting portion that is substantially perpendicular to said first abutting surface;
said pushing member is mounted to said mounting portion of said abutting member, is movable along an axis parallel to a longitudinal axis of said abutting member, and has a pushing surface that is substantially perpendicular to said first abutting surface; and
said limiting member is screwed to said mounting portion, and is adapted to move said pushing member along the axis parallel to the longitudinal axis of said abutting member to abut against the first end surface of the table when said abutting member is in the second working position.

7. A tile cutting machine adapted for cutting a tile, said tile cutting machine comprising:
a workbench;
a cutting unit that includes
a machine arm connected to said workbench, and
a sawblade rotatably mounted to said machine arm, and spaced apart from said workbench in a working direction;
a table that is mounted to said workbench, that is slidable along an axis extending in a sliding direction substantially perpendicular to the working direction into a space between said workbench and said sawblade, said table having
two side surfaces that are spaced apart in a widthwise direction substantially perpendicular to the sliding direction and the working direction,
a load surface that is connected to said side surfaces for supporting the tile, and
first and second end surfaces that are spaced apart in the sliding direction and that are connected between said side surfaces; and
said abutting device as claimed in claim 1 that is removably mounted to the table.

8. The tile cutting machine as claimed in claim 7, wherein:
said second end surface of said table has a slope portion; and
when said abutting member of said abutting device is in the second working position, said second abutting surface of said abutting member abuts against said slope portion of said second end surface of said table.

9. The tile cutting machine as claimed in claim 7, wherein:
said fixing unit includes at least one fixing member;
said first end surface of said table has at least one threaded hole; and
when said abutting member of said abutting device is in the first working position, said at least one fixing member extends through said first abutting surface of said abutting member, and threadedly engages said at least one threaded hole.

* * * * *